(12) United States Patent
Steadman

(10) Patent No.: US 7,957,225 B2
(45) Date of Patent: Jun. 7, 2011

(54) ALERTING SYSTEM FOR A FACILITY

(75) Inventor: Robert L. Steadman, Mansfield, MA (US)

(73) Assignee: Textron Systems Corporation, Wilmington, MA (US)

( * ) Notice: Subject to any disclaimer, the term of this patent is extended or adjusted under 35 U.S.C. 154(b) by 762 days.

(21) Appl. No.: 11/962,970

(22) Filed: Dec. 21, 2007

(65) Prior Publication Data

US 2010/0284249 A1    Nov. 11, 2010

(51) Int. Cl.
*G01S 3/80* (2006.01)
(52) U.S. Cl. .......................................................... 367/124
(58) Field of Classification Search .................. 367/136, 367/118, 124, 127, 129
See application file for complete search history.

(56) References Cited

U.S. PATENT DOCUMENTS

| 3,824,532 | A | 7/1974 | Vandierendonck |
| 5,147,977 | A | 9/1992 | Reichert |
| 5,161,127 | A | 11/1992 | Grosch |
| 6,192,134 | B1 | 2/2001 | White et al. |
| 6,288,973 | B1 | 9/2001 | Joynes |
| 6,980,152 | B2 | 12/2005 | Steadman et al. |
| 2002/0181721 | A1 | 12/2002 | Sugiyama et al. |

FOREIGN PATENT DOCUMENTS

| DE | 28 29 239 C1 | 6/1983 |
| DE | 39 29 077 A1 | 3/1991 |
| DE | 40 13 790 A1 | 10/1991 |
| FR | 2 774 474 A | 8/1999 |
| GB | 2104218 A * | 3/1983 |
| WO | 97/08896 A | 3/1997 |
| WO | WO 2009085345 A1 * | 7/2009 |

OTHER PUBLICATIONS

International Search Report and Written Opinion for PCT/US2008/076649, mailed on Apr. 6, 2009.

* cited by examiner

*Primary Examiner* — Dan Pihulic
(74) *Attorney, Agent, or Firm* — BainwoodHuang

(57) ABSTRACT

A surveillance system is configured to detect a rotary-wing aircraft approaching a fixed facility and provide a warning upon detection. The system includes acoustic processing nodes that receive acoustic signals from the environment surrounding the fixed facility. As the nodes receive the acoustic signals, the nodes perform a spectral analysis of the signals to detect if the source of the acoustic signals is a rotary-wing aircraft. Additionally, based upon the acoustic signals, the nodes detect an altitude of the rotary-wing aircraft and a distance between the rotary-wing aircraft and the fixed facility. In the case where the system identifies the rotary-wing aircraft as encroaching a predefined geographical area outside of the facility, based upon the altitude and distance between the rotary-wing aircraft and the facility, the system generates a warning to allow security forces to intercept the rotary-wing aircraft prior to its arrival at the facility.

18 Claims, 7 Drawing Sheets

ALERTING SYSTEM FOR A FACILITY

BACKGROUND

Conventional high-value, fixed facilities, such as facilities that store nuclear materials or maximum security prisons, typically include security systems that allow for detection and response to a perceived threat. For example, typical high value fixed facilities include security systems that detect potential ground-based intrusions (e.g., cars or trucks) that occur in the vicinity of the facility. In response to detecting such an intrusion, the security system generates a warning thereby allowing the facility's security force to provide an appropriate ground-based response to the perceived intrusion.

SUMMARY

While security systems for high-value, fixed facilities allow detection and response to ground based intrusions, certain facilities can also require security systems that provide detection and warning for air based intrusions. Mobile aircraft, such as rotary-wing aircraft (e.g., helicopters), can pose a threat to high-value, fixed facilities. Certain types of aerial moving target detection systems, such as Radio Detection and Ranging (RADAR) systems can be utilized to detect the range or speed of a rotary-wing aircraft relative to the facility, RADAR systems suffer from a variety of deficiencies. For example, conventional RADAR systems are relatively expensive to install and maintain and require dedicated operators to run the systems 24 hours a day, seven days a week. Also, traditional RADAR systems are utilized to detect targets in line-of-sight scenarios. Accordingly, in the case where the high-value, fixed facility is surrounded by obstacles (e.g., mountains, hills, ridges etc.) conventional RADAR systems would be unable to detect the presence of oncoming targets located behind the obstacles relative to the facility.

By contrast to conventional aerial moving target detection systems, embodiments of the present invention relate to a surveillance system configured to detect rotary-wing aircraft, such as helicopters, approaching a fixed facility and provide a warning upon detection. The system includes nodes that receive and process acoustic signals from the environment surrounding the fixed facility. As the nodes receive the acoustic signals, the nodes perform a spectral analysis of the signals to detect if the source of the acoustic signals is a rotary-wing aircraft. Additionally, based upon the acoustic signals, the nodes detect an altitude of the rotary-wing aircraft and a distance between the rotary-wing aircraft and the fixed facility. In the case where the system identifies the rotary-wing aircraft as encroaching a predefined geographical area (which can be irregular in plan and elevation) outside of the facility, based upon the altitude and distance between the rotary-wing aircraft and the facility, the system generates a warning to allow security forces to intercept the rotary-wing aircraft prior to its arrival at the facility. Because the nodes receive acoustic signals from the environment to detect potential aerial intrusion of the facility by a rotary-wing aircraft, the nodes can detect the presence of rotary-wing aircraft relative to the facility in non line-of-sight scenarios (e.g., as the rotary-wing aircrafts fly in canyons or behind hills surrounding the facility). Furthermore, because the acoustic processing nodes function passively, the system functions automatically and does not require a dedicated operator to run the system.

In one arrangement, a method for providing a warning for a facility includes receiving an acoustic signal, classifying a source of the acoustic signal based upon a spectral analysis of a frequency-based domain signature of the acoustic signal, and detecting a distance of the source of the acoustic signal from the facility and an altitude of the source of the acoustic signal relative to the facility based upon the acoustic signal. The method includes generating the warning (i) when the source of the acoustic signal is classified as a rotary-wing aircraft and (ii) when the detected distance of the source of the acoustic signal from the facility and the detected altitude of the source of the acoustic signal relative to the facility falls within a defined geographical zone relative to the facility.

In one arrangement, a system for cuing a warning signal for a facility includes a set of nodes disposed at the facility, each node of the set of nodes carrying a plurality of audio sensors. Each node of the set of nodes includes a controller configured to receive an acoustic signal from the plurality of audio sensors, classify a source of the acoustic signal based upon a spectral analysis of a frequency-based domain signature of the acoustic signal, and detect a distance of the source of the acoustic signal from the facility and an altitude of the source of the acoustic signal relative to the facility based upon the acoustic signal. For example, to detect the distance and altitude of the source of the acoustic signal from the facility, the system determines the bearing and elevation to the source from each node. Bearing and elevation from multiple nodes thereby permits, through triangulation or similar techniques, the position of the source relative to the facility in terms of bearing/altitude/range or Cartesian coordinates to be computed by the controller. The controller is then configured to generate the warning (i) when the source of the acoustic signal is classified as a rotary-wing aircraft and (ii) when the detected distance of the source of the acoustic signal from the facility and the detected altitude of the source of the acoustic signal relative to the facility falls within a predefined geographical zone relative to the facility. Also, over time, the system can calculate the source's velocity vector and estimated time of arrival if the source approaches facility.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a surveillance system configured to detect certain mobile aircraft, such as rotary-wing aircraft, approaching a fixed facility and provide a warning upon detection. The system includes nodes that receive and process acoustic signals from the environment surrounding the fixed facility. As the nodes receive the acoustic signals, the nodes perform a spectral analysis of the signals to detect if the source of the acoustic signals is a rotary-wing aircraft. Additionally, based upon the acoustic signals, the nodes detect an altitude of the rotary-wing aircraft and a distance between the rotary-wing aircraft and the fixed facility. In the case where the system identifies the rotary-wing aircraft as encroaching a predefined geographical area outside of the facility, based upon the altitude and distance between the rotary-wing aircraft and the facility, the system generates a warning to allow security forces to intercept the rotary-wing aircraft either prior to its arrival at the facility or when the rotary-wing aircraft arrives at the facility before harm can be done. Because the nodes receive acoustic signals from the environment to detect potential aerial intrusion of the facility by a rotary-wing aircraft, the nodes can detect the presence of rotary-wing aircraft relative to the facility in non line-of-sight scenarios (e.g., as the rotary-wing aircraft fly in canyons or behind hills surrounding the facility). Furthermore, because the acoustic processing nodes function passively with no moving parts or emissions, there are no licensing or other regulatory issues and routine maintenance is essentially eliminated. Also, the system functions automatically and does not require a dedicated operator to run the system thereby greatly reducing operating costs compared to RADAR solutions, for example.

Figure 1:
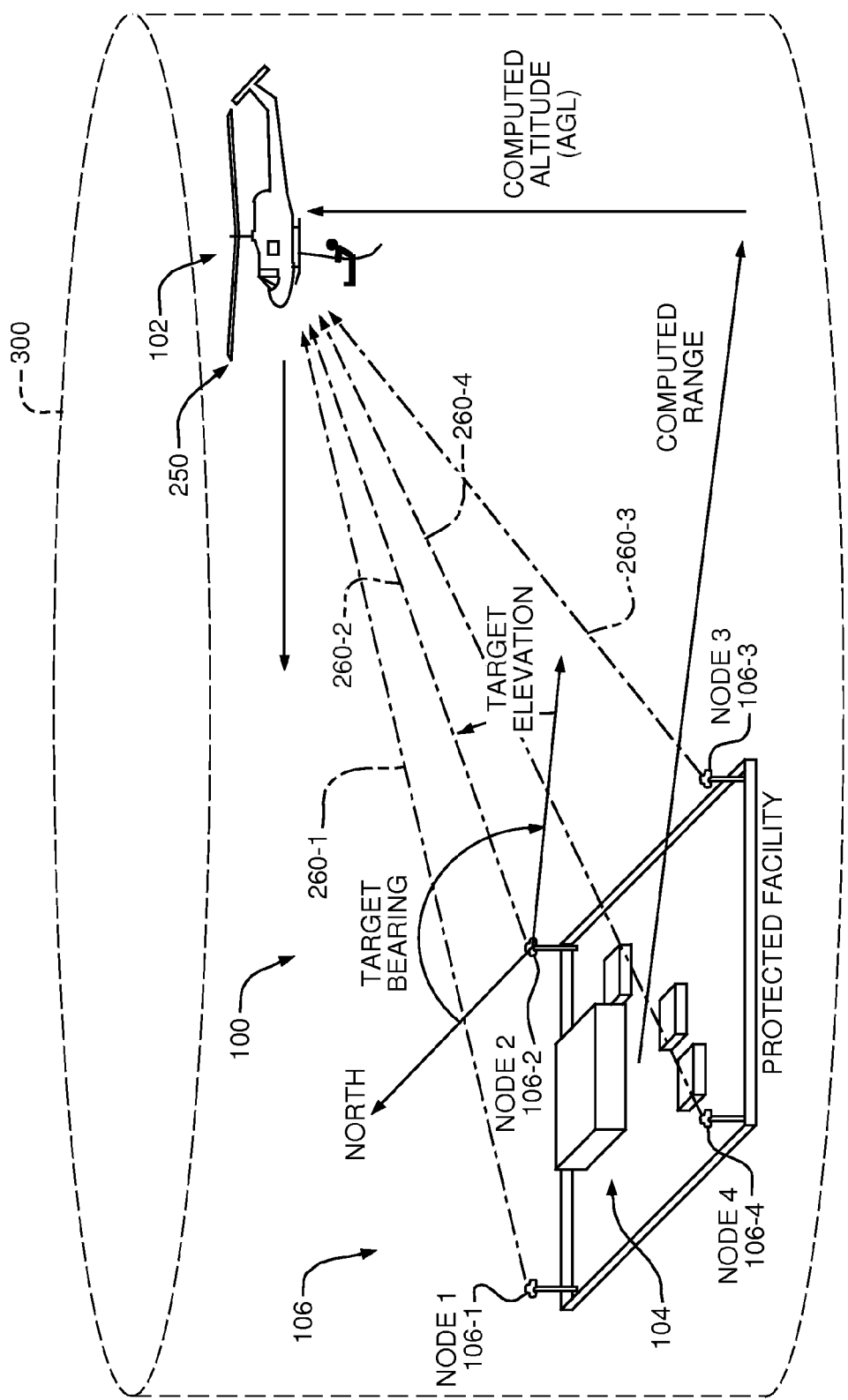
FIG. 1 illustrates a surveillance system, according to one embodiment.

FIG. 1 illustrates a surveillance system 100 configured to detect the presence of a rotary-wing aircraft 102, such as a helicopter, approaching a fixed facility 104 and to detect a range and altitude of the rotary-wing aircraft 102 relative to the fixed facility 104. The surveillance system 100 is also configured to provide a warning when the rotary-wing aircraft 102 approaches a defined geographic zone surrounding the fixed facility 104, according to one embodiment of the invention.

The system 100 includes a set of nodes 106, disposed about the fixed facility 104. Because fixed facilities 104 can be at risk for intrusion by mobile aircraft, such as a rotary-wing aircraft 102, the nodes 106 are configured to distinguish the presence of rotary-wing aircraft 102 from other vehicles in the vicinity of the fixed facility 104. In order to accomplish such distinction, the surveillance system 100 utilizes the unique acoustic signature generated by a rotary-wing aircraft 102 in flight.

Figure 3:
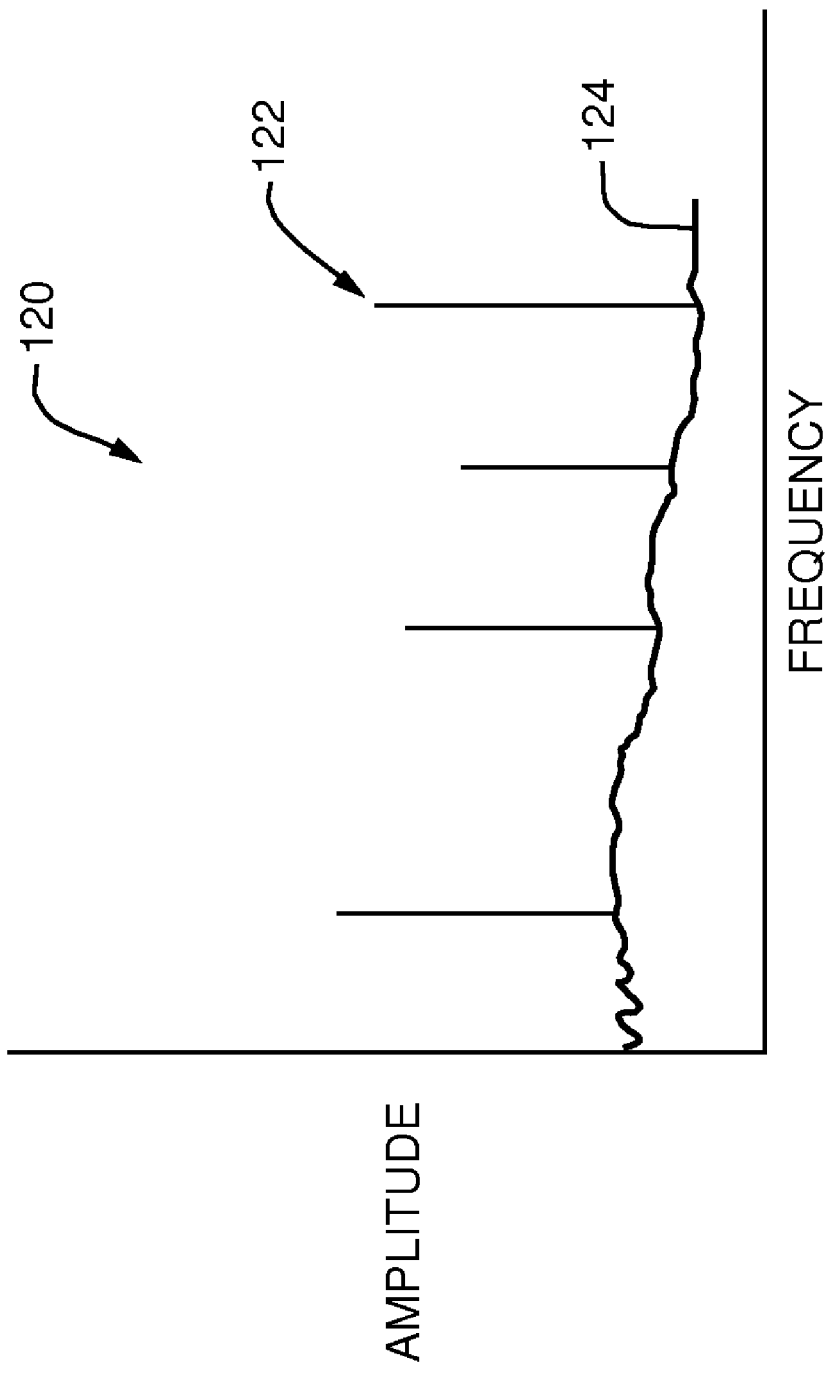
FIG. 3 illustrates a schematic representation of an acoustic signature such as generated by a rotary-wing aircraft.

The aero-acoustics of rotary-wing aircraft, such as a helicopter, are a function of flight aerodynamics and are impractical to suppress, mask, or otherwise countermeasure. Intense rotor noise is coupled to several physical mechanisms including blade lift forces, high tip-speed impulsive forces (thickness noise) and wake interaction (blade-vortex noise). As illustrated in the graph 120 of FIG. 3, acoustic signatures generated by rotary-wing aircraft 102 are characterized by strong harmonically related peaks 122 in the frequency domain. Such peaks 122 tend to be stationary in frequency because rotary-wing aircraft rotors operate at relatively constant rotations per minute (RPM). Therefore, because of the consistency of the acoustic signals generated by a rotary-wing aircraft 102 during operation, the surveillance system 100 is configured to monitor acoustic signals received from the area surrounding the fixed facility 104 in order to detect and classify the presence of a rotary-wing aircraft 102 in the vicinity of the fixed facility 104. Additionally, rotary-wing aircraft sound waves bend around obstacles such as hills or ridges to a very significant extent. Accordingly, by configuring the nodes 106 of the surveillance system 100 to monitor acoustic signals received from the area surrounding the fixed facility 104, in the case where the fixed facility 104 is surrounded by mountains or is located in a valley, contrary to a line-of-sight system such as RADAR, the surveillance system 100 can detect a rotary-wing aircraft 102 approaching the facility 104.

Returning to FIG. 1, the surveillance system 100 can include any number of nodes 106 disposed about the fixed facility 104. The use of a single node 106 working alone can detect a bearing of a rotary-wing aircraft 102 but can only derive a rough estimate of a range and altitude of the rotary-wing aircraft 102. Two nodes 106 can be used to detect a three-dimensional positioning of the rotary-wing aircraft 102 relative to the fixed facility 104 if the measured bearing differences between the nodes 106 is are sufficient to provide good triangulation geometry. Three nodes 106 can be used to detect a three-dimensional positioning of the rotary-wing aircraft 102 regardless of bearing differences between the nodes 106. In the arrangement illustrated in FIG. 1, the surveillance system 100 includes four nodes 106-1, 106-2, 106-3, and 106-4 disposed in a rectilinear pattern about the fixed facility 104. The use of four nodes 106 within the surveillance system 100 allows for detection of a position of a rotary-wing aircraft 102 within a three-dimensional Cartesian coordinate system relative to the fixed facility 104, as will be described below, while providing a level of redundancy. While the nodes can be disposed in the rectilinear pattern, it should be understood that the nodes 106 can be disposed in any regular or irregular geometric pattern relative to the facility 104 as long as the node 106 positions are know to the system 100.

Figure 2:
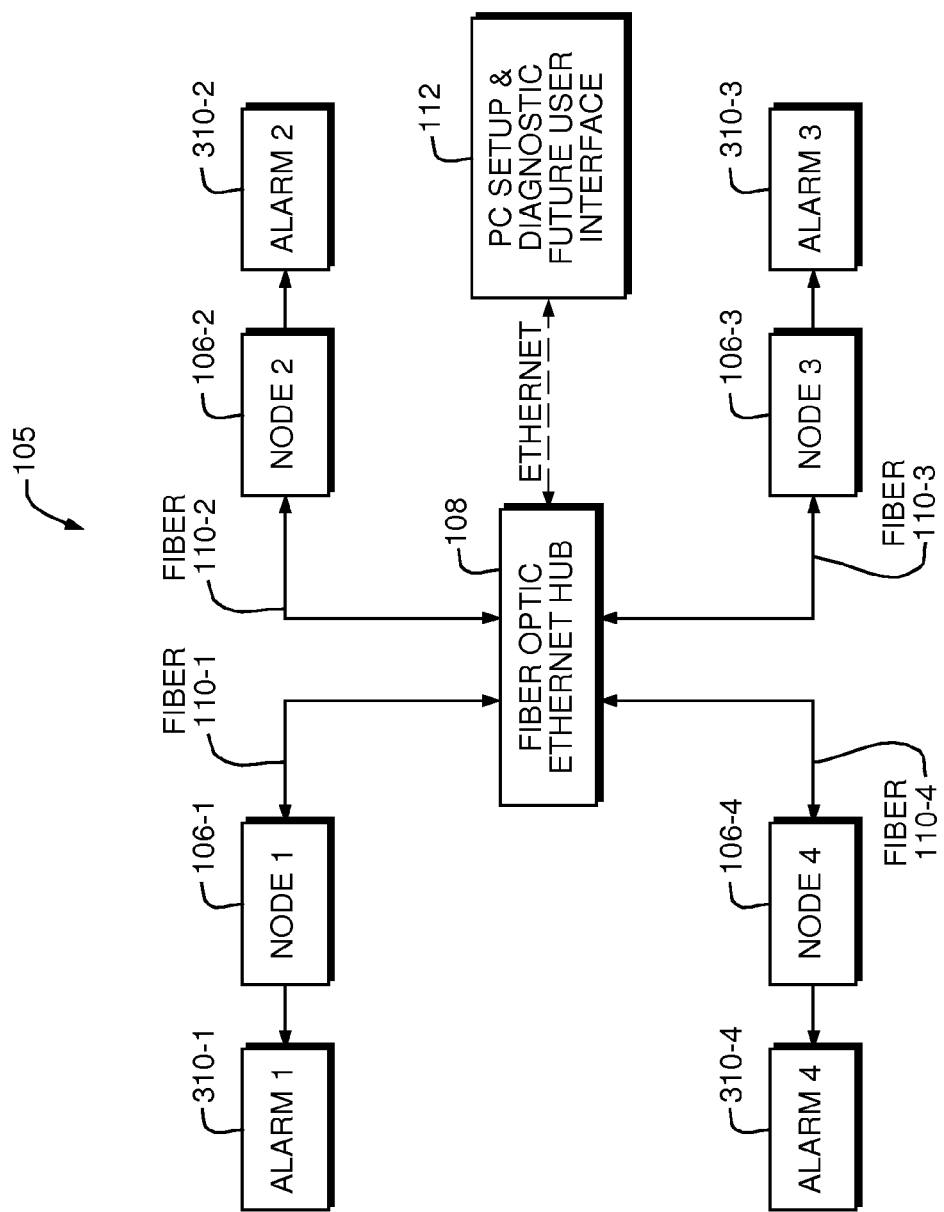
FIG. 2 illustrates nodes of the surveillance system configured as part of a network

The nodes 106 are configured as part of a network 105, as illustrated in FIG. 2. For example, each node 106-1 through 106-4 is coupled to a hub 108, such as a fiber optic Ethernet hub, via fiber optic cables 110-1 through 110-4, respectively. With such a configuration, as the nodes 106 receive and process the acoustic signals, each node 106 can exchange data with other nodes 106 within the network to provide data correlation and threat estimation. With such an arrangement, a central data processing station is not required for acoustic signal processing. Accordingly, the surveillance system 100 minimizes bottlenecking of data processing and is readily scalable based upon the geographic size of the fixed facility. The configuration of the surveillance system 100 also minimizes or eliminates potential single point failure modes inherent in central data processing systems.

Figure 4:
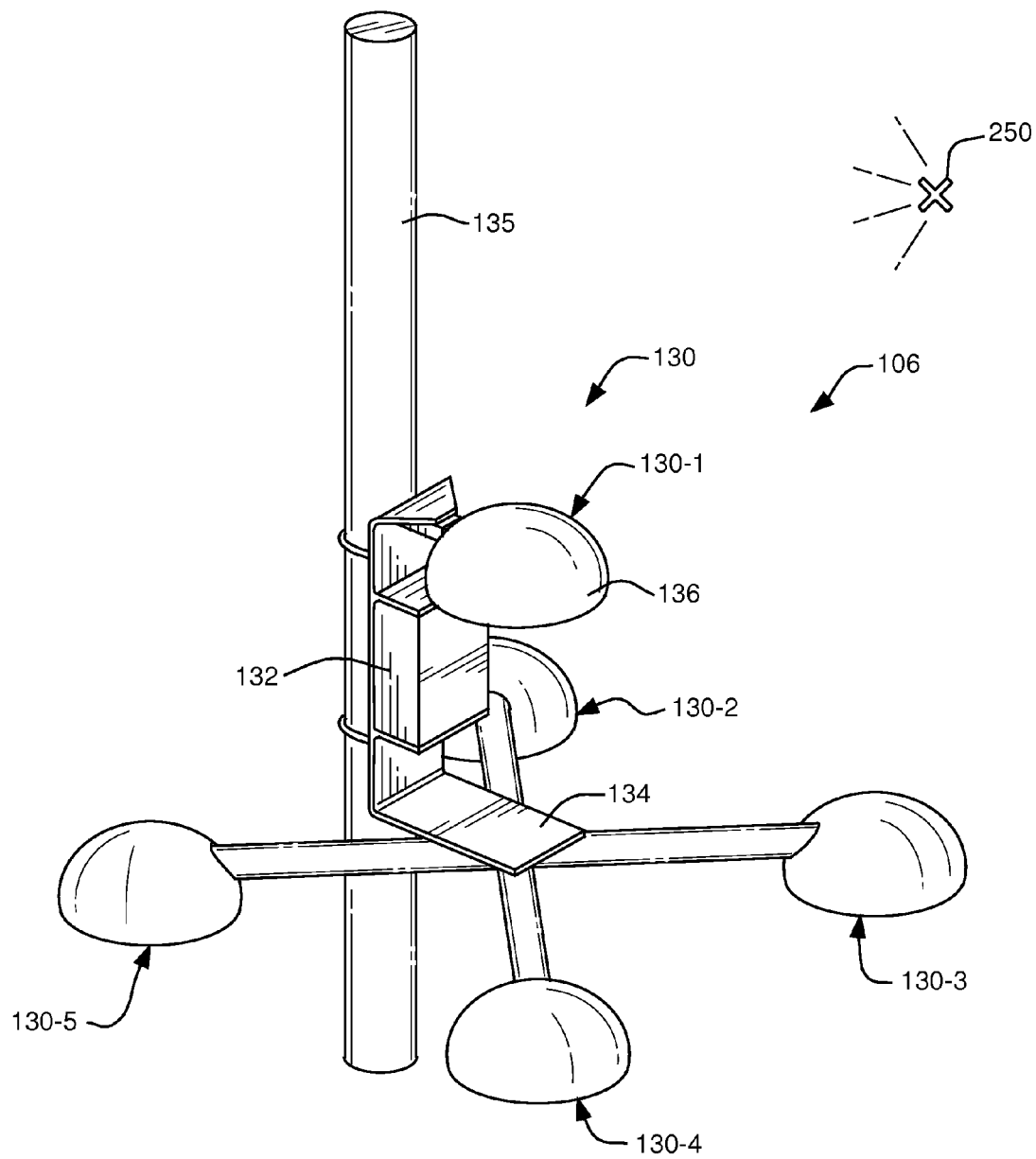
FIG. 4 illustrates a schematic representation of the node of FIG. 3.

In order to detect the presence of a rotary-wing aircraft 102 relative to the fixed facility 104, each node 106 is configured as an acoustic sensor. For example, as illustrated in FIG. 4 each node 106 includes a set of microphone assemblies 130, a controller 132, and a mounting structure 134 utilized to secure the set of microphone assemblies 130 and the controller 132 to a location, such as a pole 135. While each node 106 can be mounted at any height relative to a fixed facility 104, in one arrangement, each node is mounted on poles 135 above the roofline of the fixed facility 104 to minimize multi-path effects.

Each microphone assembly 130 includes a housing 136, such as a dome shaped housing, that contains a microphone. The housing 136 includes a windscreen (not shown), such as a metallic or closed cell foam windscreen, disposed on the underside face of the housing 136. Use of the dome shaped housing and the windscreen aids in minimizing detection of noise caused by environmental conditions (wind, rain, etc.). While any number of microphone assemblies 130 can be used, as illustrated in FIG. 4, the node 106 includes five microphone assemblies 130-1 through 130-5 to provide a relatively large signal to noise ratio for received acoustic signals. In one arrangement, the microphone assemblies 130-2 through 130-5 are disposed within a planar and substantially four foot diameter array to provide an adequate detection range for the node 106 while the microphone assembly 130-1 is disposed at an elevation of about two feet to provide adequate accuracy in detecting elevation angle relative to the node 106.

Figure 5:
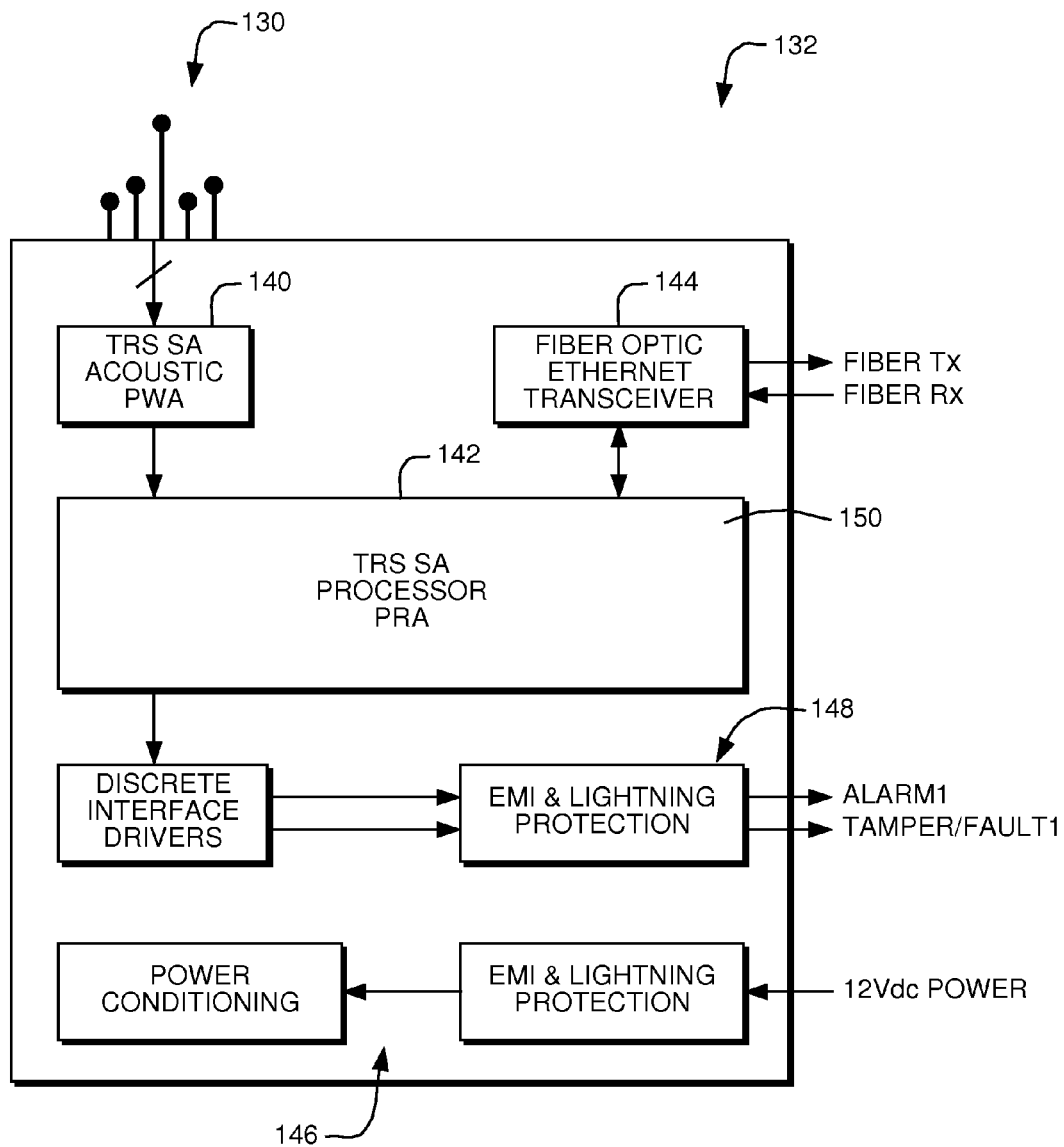
FIG. 5 illustrates a schematic representation of a controller of the node of FIG. 3.

Each a microphone is electrically coupled to the controller 132 via cables. FIG. 5 illustrates an arrangement of the controller 132. As shown, the controller 132 includes a Processor Printed Wiring Assembly 142 configured to filter and digitize analog acoustic signals from the microphone assembly 130. The controller 132 includes an Acoustic Printed Wiring Assembly 140 that handles all signal processing and external interface functions, as will be described in detail below. The controller 132 also includes a Fiber Optic Transceiver 144 configured to support communications with the other nodes 106 and with a diagnostic terminal 112 (illustrated in FIG. 2). The controller 132 further includes a power conditioner 146 as well as an alarm 148 configured to provide an indication of external tampering of the node 106 or failure of the node 106.

Figure 6:
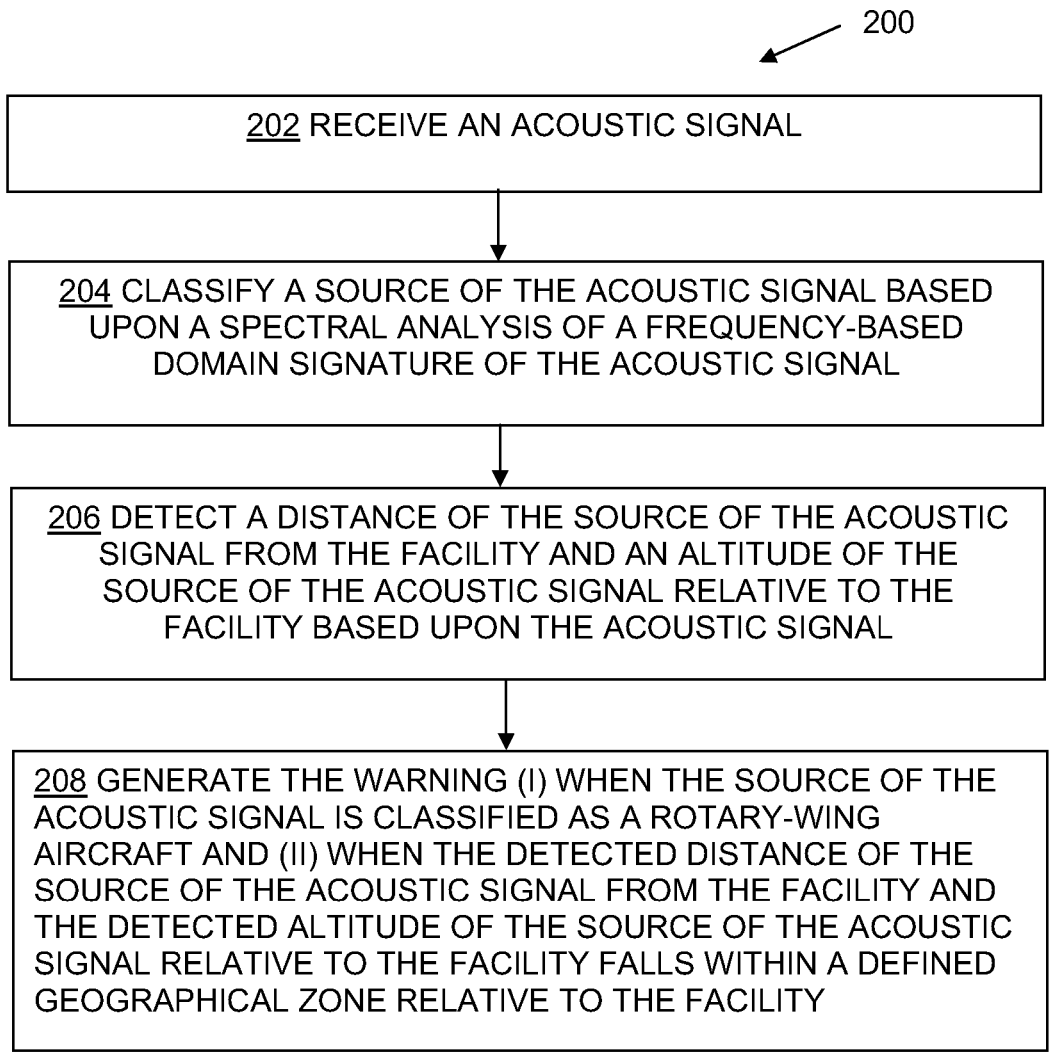
FIG. 6 is a flowchart illustrating operation of the node of FIG. 3.

Returning to FIG. 1, as indicated above, the controller 132 of each node 106 is configured to distinguish the presence of rotary-wing aircraft 102 from other vehicles in the vicinity of the fixed facility 104 as well as provide a warning when the rotary wing aircraft enters a defined geographic area relative to the fixed facility 104. FIG. 6 is a flowchart 200 illustrating operation of the controller 132 according to one embodiment of the invention.

In step 202, the controller 132 receives an acoustic signal. In use, the microphones of the microphone assembly 130 receive audio signals from the environment at a rate of approximately 2000 Hz. The microphones transmit the audio signals to the controller 132 where the controller 132 filters and digitizes each signal received from each microphone assembly 130.

In step 204, the controller 132 classifies a source of the acoustic signal based upon a spectral analysis of a frequency-based domain signature of the acoustic signal. For example, as indicated above, acoustic signatures generated by rotary-wing aircraft 102 are characterized by strong harmonically related peaks 122 in the frequency domain. Because of this characteristic, in order to detect a source of an audio signal as being a rotary-wing aircraft, the controller 132 converts the audio signals from a time-based domain to a frequency domain, such as by using a fast Fourier transform (FFT). Next, the controller 132 compares a set of peak harmonics of the frequency-based domain signal with a set of peak harmonics that characterize an acoustic signal generated by a rotary-wing aircraft. In one arrangement, with reference to FIG. 3, peak harmonics 122 of the frequency based domain signal are defined as portions of the signal that extend by a certain amount (e.g., 10 dB) above a background noise threshold 124. In one arrangement, as illustrated in FIG. 5, the controller 130 is configured with a library 150 of peak harmonics characterizing rotary wing aircraft. Accordingly, the comparison process can be performed by the controller 132 of each node 106 after converting the audio signals to the frequency based domain. In the case where the controller 132 detects a correspondence between the peak harmonics of the frequency-based domain signal and peak harmonics that characterize the acoustic signal generated by the rotary-wing aircraft 102, the controller classifies the source of the acoustic signal as originating from the rotary-wing aircraft 102.

Returning to FIG. 6, in step 206, the controller 132 detects a distance of the source of the acoustic signal from the facility 104 and an altitude of the source of the acoustic signal relative to the facility 104 based upon the acoustic signal.

In one arrangement, in order to detect the distance and the altitude of the source of the acoustic signal (e.g., the rotary-wing aircraft), each controller 132 at each node 106 first detects a bearing and elevation of the source relative to its corresponding node 106. For example, with reference to FIGS. 1 and 2, as each microphone assembly 130 receives an audio signal from a particular source location 250 the gain of the audio signal provided from each microphone assembly 130 to the controller 132 will be relatively stronger or weaker based upon the distance between the source location 250 and each of the microphone assemblies. The controller 132 at each node 106 then combines the signals from each microphone assembly 130 and utilizes a beam forming technique to generate a series of composite audio signals and to detect a general direction of the source location 250 based upon the composite signal having the largest relative gain. For example, as shown in FIG. 1, each controller 132 at each node 106-1 through 106-4 creates a largest gain composite signal 260-1 through 260-4. Based upon these signals 260-1 through 260-4, the controller 132 at each node 106 detects a bearing or direction of the rotary-wing aircraft 102 as well as an elevation of the rotary-wing aircraft 102 relative to the planar array of microphone assemblies 130-2 through 130-5 at each node 106-1 through 106-4. Beam forming in a microphone assembly 130 having a five-microphone array as described provides a relatively large signal-to-noise ratio (SNR) and allows the controller 132 to null out spurious audio signals or sources and enhance reception from the source of interest, thereby increasing detection range of the surveillance system 100. While each node 106 can utilize a beam forming technique to detect the bearing and elevation of a target, one of ordinary skill in the art will understand that other techniques can be used as well. For example, in one arrangement, each controller 132 utilizes interferometer processing techniques to determine the bearing and elevation of a source of an acoustic signal.

Once each node 106 has detected the relative bearing and elevation of the rotary-wing aircraft 102, the nodes 106 exchange bearing and altitude information with each other to detect the distance of the rotary-wing aircraft 102 from the facility and an altitude of the rotary-wing aircraft 102 relative to the facility. In one arrangement, each node 106 executes a data fusion algorithm to combine bearing and elevation information from each of the other nodes 106 to determine distance of the rotary-wing aircraft 102 from the facility as well as its altitude relative to the facility. For example, assume that the first node 106-1 receives bearing and elevation data from the second node 106-2 (i.e., represented as vector 260-2) and the third node 106-3 (i.e., represented as vector 260-3). In one arrangement, the first node 260-1 then performs a three-dimensional triangulation procedure using its own bearing and elevation information (i.e., represented as vector 260-1) as well as the bearing and elevation information from the first and second nodes to determine the Cartesian position (i.e., range or distance from the facility 104) and altitude of the rotary-wing aircraft 102. Each controller 132 of each node 106 performs this procedure to accurately detect the location of the rotary-wing aircraft 102 relative to each node 106 and relative to the facility 104. In another arrangement, the controllers 132 at each node 106 of the surveillance system 100 utilize the bearing and elevation data collected at each node to detect the Cartesian position and altitude of the rotary-wing aircraft 102 utilizing a Kalman filter technique.

Returning to FIG. 6, in step 208, the controller generates 132 the warning (i) when the source of the acoustic signal is classified as a rotary-wing aircraft 102 and (ii) when the detected distance of the source of the acoustic signal from the facility and the detected altitude of the source of the acoustic signal relative to the facility falls within a defined geographical zone relative to the facility 104.

For example, in one arrangement each controller 132 is configured with range and altitude thresholds that define a geographical zone where an alarm or warning should be issued. For example, in one arrangement as illustrated in FIG. 1, the range and altitude thresholds is defined as cylindrical zone 300 of up to 2 miles in radius and 5000 feet altitude above ground level (AGL) about the fixed facility 104. In the case where at least one of the controllers 132 detects that the location of the rotary-wing aircraft 102 falls within the geographical zone 300, the controller 132 generates a warning to security forces protecting the facility to warn the forces of the rotary-wing aircraft 102 threat. For example, the controller 132 can activate a visual or audio alarm at a location common to all nodes 106 within the system. In another example, the controller 132 of a particular node 106 can activate a visual or audio alarm 310 disposed at that particular node, as illustrated in FIG. 2. In another example, in addition to the warning the controller 132 of a particular node 106 causes cueing of camera or weapon systems onto the rotary-wing aircraft 102.

As indicated above, the surveillance system 100 allows a fixed facility 104 to discriminate rotary-wing aircraft 102, such as helicopters, from other types of aircraft, to detect the range and altitude of the rotary-wing aircraft 102 from the facility 104, and to provide a warning when the rotary-wing aircraft 102 travels within a particular geographic area relative to the facility 104. Because the surveillance system 100 performs such detection based upon audio signals generated by rotary-wing aircraft 102, the surveillance system 100 can detect rotary-wing aircraft 102 in non line-of-sight scenarios (e.g. in canyons or behind hills). The surveillance system 10 has relatively lower operating costs compared to RADAR because the system 100 is fully automatic and does not require a dedicated operator.

While various embodiments of the invention have been particularly shown and described, it will be understood by those skilled in the art that various changes in form and details may be made therein without departing from the spirit and scope of the invention as defined by the appended claims.

For example, as indicated above, each node 106 of the surveillance system 100 is configured to detect the range and altitude of a rotary-wing aircraft 102 relative to a facility 104. Such description is by way of example only. In one arrangement, the controller 132 at each node 106 detects frequency changes in the incoming audio signals as provided by the microphone assembly 130 over time. Because these frequency changes are due solely to Doppler shifts, the controller 132 examines the Doppler shifts over time to detect a velocity of the rotary-wing aircraft 102 relative to the corresponding node 106. For example, Such detection can be considered as analogous to the Moving Target Indicator (MTI) found in RADAR systems.

In another example, as described above, during operation as each node 106 receives audio signals, the controller 132 at each node classifies a source of the acoustic signal based upon a spectral analysis of a frequency-based domain signature of the acoustic signal. For example, the controller 132 compares a set of peak harmonics of a frequency-based domain signal with a library 150 of peak harmonics that characterize the acoustic signal generated by the rotary-wing aircraft. Such description is by way of example only. Typically, different types of rotary-wing aircraft 102 each have a unique peak harmonic signature. Therefore, in one arrangement, as the controller 132 performs the comparison, the controller can detect the type (e.g., by manufacturer, model, etc.) that generates the initially received audio signal. The controller 132 at each node 1-6 can utilize this information either to provide an alert or warning when detecting certain types of rotary-wing aircraft 102 or to withhold the generation of an alert or warning when detecting other types of rotary-wing aircraft 102.

In another example, as described above, each controller 132 is configured with range and altitude thresholds that define a geographical zone where an alarm or warning should be issued. For example, in one arrangement as illustrated in FIG. 1, the range and altitude thresholds is defined as cylindrical zone 300 of up to 2 miles in radius and 5000 feet altitude above ground level (AGL) about the fixed facility 104. In one arrangement, and with reference to FIG. 7, the fixed facility 104 can be located adjacent a secondary facility 400 defining a geographic zone 402 within which rotary-wing aircraft 102, originating from the secondary facility 400, fly. As illustrated, the geographic zone 402 of the secondary facility overlaps 404 the geographic zone 300 of the fixed facility 104. In order to permit rotary-wing aircraft 102 from the secondary facility 400 to fly within the overlapping zone 404 without generation of a warning or alarm, the controller 132 of each node 106 within the surveillance system 100 is configured to recognize the overlapping zone 404 as an exclusionary area that is excluded from the geographical zone 300 relative to the facility 104. Accordingly, when a controller 132 detects the presence of a rotary-wing aircraft 102 within the exclusionary area, the controller withholds generation or activation of an alarm or warning.

Figure 7:
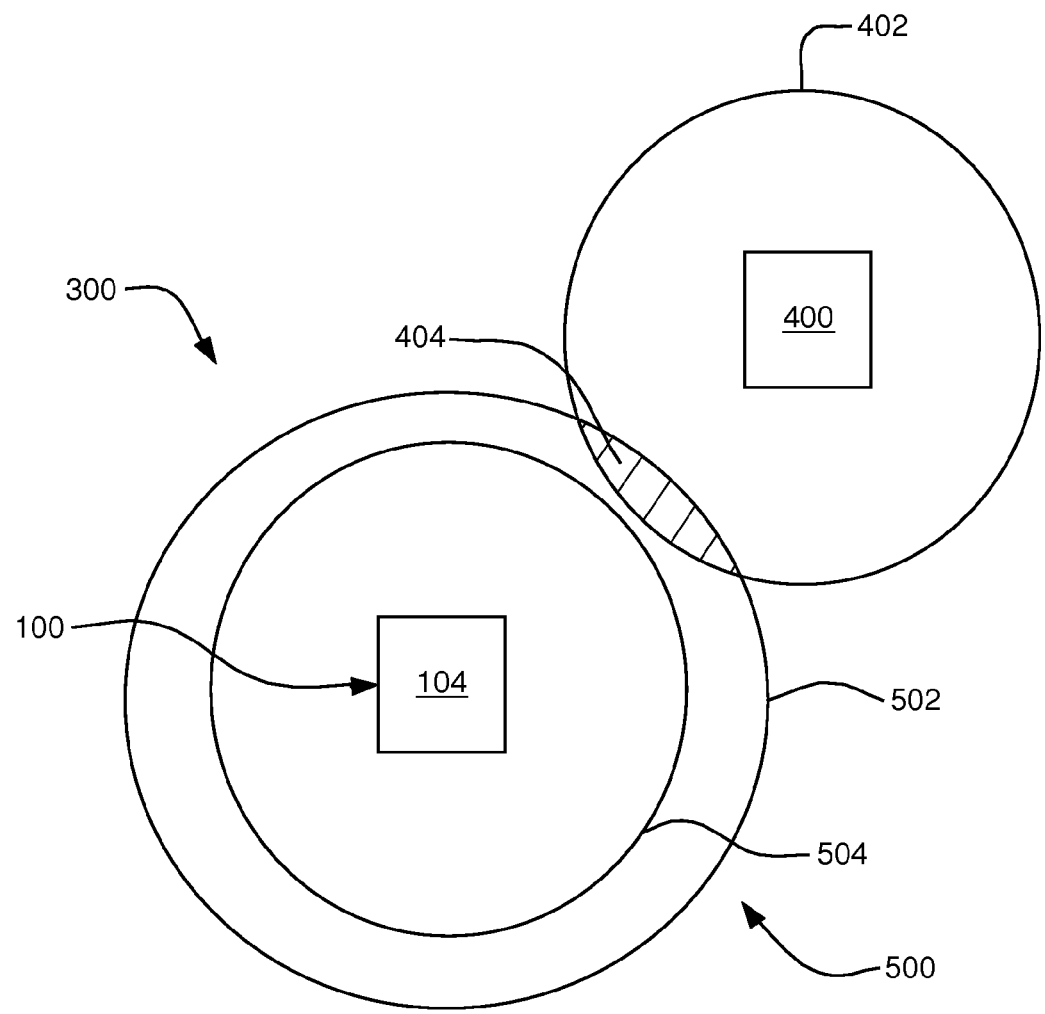
FIG. 7 illustrates an overhead view of a surveillance system and fixed facility, according to one embodiment.

As indicated above with reference to FIG. 1, each controller 132 is configured with range and altitude thresholds that define a geographical zone 300 where an alarm or warning should be issued. With reference to FIG. 7, each controller is configured with range and altitude thresholds that define multiple zones 500 relative to the fixed facility 104. For example, as shown the controllers 132 are configured to define a first and second zone 502, 504 relative to the facility 104. In the case where a controller 132 detects a rotary-wing aircraft 102 as entering either of the zones 502, 504, the controller 132 can provide or activate a warning based upon the detected zone entered. For example, in the case where a controller 132 detects a rotary-wing aircraft 102 as entering the first zone 502, the controller 132 causes a lamp located at a central station to flash. As the controller 132 detects the rotary-wing aircraft 102 enter the second zone 504 from the first zone 502, the controller 132 causes the lamp to provide steady illumination. Accordingly, the different types of warnings provided by the controller 132 indicate the imminence of a threat relative to the facility 104.

As indicated above, the controllers 132 at each node 106 of the surveillance system 100 can utilize the bearing and elevation data collected at each node to detect the Cartesian position and altitude of the rotary-wing aircraft 102 utilizing a Kalman filter technique. Additionally, the Kalman filter technique can be used to combine bearing and/or elevation data from multiple nodes 106 using estimates of the quality of the input data to generate an estimate of the quality of the position solution at the output. The Kalman filter technique can also be used to estimate a 3D velocity vector of a source and an extrapolated prediction of the source's path.

What is claimed is:

1. A method for providing a warning for a facility, comprising:

receiving an acoustic signal at a set of nodes disposed at the facility;

classifying a source of the acoustic signal based upon a spectral analysis of a frequency-based domain signature of the acoustic signal;

detecting a bearing of the source of the acoustic signal and an elevation of the source of the acoustic signal relative to each node of the set of nodes;

transmitting, from a first node of the set of nodes to a second node of the set of nodes, the bearing of the source of the acoustic signal and the elevation of the source of the acoustic signal relative to the first node;

detecting a distance of the source of the acoustic signal from the facility and an altitude of the source of the acoustic signal relative to the facility based upon the acoustic signal; and generating the warning (i) when the source of the acoustic signal is classified as a rotary-wing aircraft and (ii) when the detected distance of the source of the acoustic signal from the facility and the detected altitude of the source of the acoustic signal relative to the facility falls within a defined geographical zone relative to the facility;

wherein detecting the distance of the source of the acoustic signal from the facility and the altitude of the source of the acoustic signal relative to the facility based upon the acoustic signal comprises detecting, by the second node, the distance of the source of the acoustic signal from the facility and the altitude of the source of the acoustic signal relative to the facility based upon the bearing of the source of the acoustic signal and the elevation of the source of the acoustic signal relative to the first node and based upon the bearing of the source of the acoustic signal and the elevation of the source of the acoustic signal relative to the second node.

2. The method of claim 1, wherein detecting the distance of the source of the acoustic signal from the facility and the altitude of the source of the acoustic signal relative to the facility based upon the acoustic signal comprises triangulating a position of the source of the acoustic signal based upon the bearing of the source of the acoustic signal and the elevation of the source of the acoustic signal relative to each node of the set of nodes.

3. The method of claim 1, wherein each node carries a plurality of acoustic detectors and wherein:

receiving the acoustic signal at a set of nodes disposed at the facility comprises receiving the acoustic signal by a plurality of acoustic sensors carried by each node of the set of nodes;

detecting the bearing of the source of the acoustic signal and the elevation of the source of the acoustic signal relative to each node of the set of nodes comprises detecting the bearing of the source of the acoustic signal and the elevation of the source of the acoustic signal relative to each node of the set of nodes based upon a strength of the acoustic signal relative to the plurality of acoustic sensors carried by each node of the set of nodes.

4. The method of claim 1, wherein detecting a distance of the source of the acoustic signal from the facility and an altitude of the source of the acoustic signal relative to the facility based upon the acoustic signal further comprises detecting a velocity of the source of the acoustic signal relative to the facility.

5. The method of claim 1, comprising:

defining an exclusionary zone as part of the defined geographical zone relative to the facility; and withholding the warning when the detected distance of the source of the acoustic signal from the facility and the detected altitude of the source of the acoustic signal relative to the facility falls within the exclusionary area of the defined geographical zone relative to the facility.

6. The method of claim 1, wherein classifying the source of the acoustic signal based upon the spectral analysis of the frequency-based domain signature of the acoustic signal comprises:

converting the acoustic signal from a time-based domain signal to a frequency-based domain signal;

comparing a set of peak harmonics of the frequency-based domain signal with a set of peak harmonics that characterize an acoustic signal generated by a rotary-wing aircraft; and classifying the source of the acoustic signal as a rotary-wing aircraft when the set of peak harmonics of the frequency-based domain signal corresponds with the set of peak harmonics that characterize the acoustic signal generated by a rotary-wing aircraft.

7. A system for cuing a warning signal for a facility, comprising:

a set of nodes disposed at the facility, each node of the set of nodes carrying a plurality of audio sensors, each node is configured to detect a bearing of the source of an acoustic signal and an elevation of the source of the acoustic signal, the set of nodes configured to:

receive the acoustic signal from the corresponding plurality of audio sensors;

classify a source of the acoustic signal based upon a spectral analysis of a frequency-based domain signature of the acoustic signal;

detect a distance of the source of the acoustic signal from the facility and an altitude of the source of the acoustic signal relative to the facility based upon the acoustic signal; and generate the warning (i) when the source of the acoustic signal is classified as a rotary-wing aircraft and (ii) when the detected distance of the source of the acoustic signal from the facility and the detected altitude of the source of the acoustic signal relative to the facility falls within a defined geographical zone relative to the facility;

wherein the set of nodes comprises a first set of nodes and a second set of nodes;

the first node of the set of nodes configured to transmit to the second node of the set of nodes, the bearing of the source of the acoustic signal and the elevation of the source of the acoustic signal relative to the first node; and when detecting the distance of the source of the acoustic signal from the facility and the altitude of the source of the acoustic signal relative to the facility based upon the acoustic signal, the second node is configured to detect the distance of the source of the acoustic signal from the facility and the altitude of the source of the acoustic signal relative to the facility based upon the bearing of the source of the acoustic signal and the elevation of the source of the acoustic signal relative to the first node and based upon the bearing of the source of the acoustic signal and the elevation of the source of the acoustic signal relative to the second node.

8. The system of claim 7, wherein when detecting the distance of the source of the acoustic signal from the facility and the altitude of the source of the acoustic signal relative to the facility based upon the acoustic signal each node is configured to triangulate a position of the source of the acoustic signal based upon the bearing of the source of the acoustic signal and the elevation of the source of the acoustic signal detected by each node of the set of nodes.

9. The system of claim 7, wherein:
when receiving the acoustic signal at a set of nodes disposed at the facility each node is configured to receive the acoustic signal by a plurality of acoustic sensors carried by each node of the set of nodes; and
when detecting the bearing of the source of the acoustic signal and the elevation of the source of the acoustic signal relative to each node of the set of nodes is configured to detect the bearing of the source of the acoustic signal and the elevation of the source of the acoustic signal relative to each node of the set of nodes based upon a strength of the acoustic signal relative to the plurality of acoustic sensors.

10. The system of claim 7, wherein when detecting a distance of the source of the acoustic signal from the facility and an altitude of the source of the acoustic signal relative to the facility based upon the acoustic signal each node of the set of nodes is configured to detect a velocity of the source of the acoustic signal relative to the facility.

11. The system of claim 7, wherein each node is configured to:
define an exclusionary zone as part of the defined geographical zone relative to the facility; and
withhold the warning when the detected distance of the source of the acoustic signal from the facility and the detected altitude of the source of the acoustic signal relative to the facility falls within the exclusionary area of the defined geographical zone relative to the facility.

12. The system of claim 7, wherein when classifying the source of the acoustic signal based upon the spectral analysis of the frequency-based domain signature of the acoustic signal, each node of the set of nodes is configured to:
convert the acoustic signal from a time-based domain signal to a frequency-based domain signal;
compare a set of peak harmonics of the frequency-based domain signal with a set of peak harmonics that characterize an acoustic signal generated by a rotary-wing aircraft; and
classify the source of the acoustic signal as a rotary-wing aircraft when the set of peak harmonics of the frequency-based domain signal corresponds with the set of peak harmonics that characterize the acoustic signal generated by a rotary-wing aircraft.

13. The method of claim 1, wherein each node of the set of nodes comprises a set of microphones, a controller disposed in electrical communication with the set of microphones, the controller having a transceiver configured to support communications with the remaining nodes of the set of nodes.

14. The method of claim 5, wherein:
defining the exclusionary zone as part of the defined geographical zone relative to the facility comprises defining the exclusionary zone as an overlapping zone common to the defined geographical zone relative to the facility and to a defined geographical zone of a second facility disposed in proximity to the facility; and
withholding the warning when the detected distance of the source of the acoustic signal from the facility and the detected altitude of the source of the acoustic signal relative to the facility falls within the exclusionary area of the defined geographical zone relative to the facility comprises withholding the warning when the detected distance of the source of the acoustic signal from the facility and the detected altitude of the source of the acoustic signal relative to the facility falls within the overlapping zone common to the defined geographical zone relative to the facility and to the defined geographical zone of the second facility disposed in proximity to the facility.

15. The method of claim 1, comprising:
defining a first geographic zone relative to the facility;
defining a second geographic zone relative to the facility, the second zone included within the first zone; and
wherein generating the warning when the detected distance of the source of the acoustic signal from the facility and the detected altitude of the source of the acoustic signal relative to the facility falls within a defined geographical zone relative to the facility comprises:
generating a first warning when the detected distance of the source of the acoustic signal from the facility and the detected altitude of the source of the acoustic signal relative to the facility falls within the first defined geographical zone relative to the facility; and
generating a second warning when the detected distance of the source of the acoustic signal from the facility and the detected altitude of the source of the acoustic signal relative to the facility falls within the second defined geographical zone relative to the facility, the second warning being distinct from the first warning and the second warning indicating an increased risk of threat to the facility, relative to the first warning.

16. The system of claim 7, wherein each node of the set of nodes comprises a set of microphones, a controller disposed in electrical communication with the set of microphones, the controller having a transceiver configured to support communications with the remaining nodes of the set of nodes.

17. The system of claim 11, wherein:
when defining the exclusionary zone as part of the defined geographical zone relative to the facility, the set of nodes is configured to define the exclusionary zone as an overlapping zone common to the defined geographical zone relative to the facility and to a defined geographical zone of a second facility disposed in proximity to the facility; and
when withholding the warning when the detected distance of the source of the acoustic signal from the facility and the detected altitude of the source of the acoustic signal relative to the facility falls within the exclusionary area of the defined geographical zone relative to the facility, the set of nodes is configured to withhold the warning when the detected distance of the source of the acoustic signal from the facility and the detected altitude of the source of the acoustic signal relative to the facility falls within the overlapping zone common to the defined geographical zone relative to the facility and to the defined geographical zone of the second facility disposed in proximity to the facility.

18. The system of claim 7, wherein the set of nodes is configured to:
define a first geographic zone relative to the facility;
define a second geographic zone relative to the facility, the second zone included within the first zone; and
when generating the warning when the detected distance of the source of the acoustic signal from the facility and the detected altitude of the source of the acoustic signal relative to the facility falls within a defined geographical zone relative to the facility comprises:
generate a first warning when the detected distance of the source of the acoustic signal from the facility and the detected altitude of the source of the acoustic signal relative to the facility falls within the first defined geographical zone relative to the facility; and generate a second warning when the detected distance of the source of the acoustic signal from the facility and the detected altitude of the source of the acoustic signal relative to the facility falls within the second defined geographical zone relative to the facility, the second warning being distinct from the first warning and the second warning indicating an increased risk of threat to the facility, relative to the first warning.

* * * * *